United States Patent [19]
Bennett

[11] Patent Number: 5,549,308
[45] Date of Patent: Aug. 27, 1996

[54] COLLET CHUCK

[76] Inventor: LaVon L. Bennett, 354 N. 424 East, Alpine, Utah 84004

[21] Appl. No.: 375,382

[22] Filed: Jan. 17, 1995

[51] Int. Cl.⁶ .................................................. B23B 31/20
[52] U.S. Cl. ............................................ 279/50; 279/157
[58] Field of Search ................................ 279/50, 51, 157

[56] References Cited

U.S. PATENT DOCUMENTS

| | | | |
|---|---|---|---|
| 628,730 | 7/1899 | Whitney et al. | 279/51 |
| 2,415,482 | 2/1947 | Greenough | 279/50 |
| 4,171,820 | 10/1979 | Klancnik | 279/50 |
| 4,690,415 | 9/1987 | Holdridge | 279/50 |

*Primary Examiner*—Steven C. Bishop
*Attorney, Agent, or Firm*—Terry M. Crellin

[57] ABSTRACT

A collet closer assembly for a machine tool has a body adapted to be attached to a spindle of a machine tool. A pair of bores extend into the body from opposite ends thereof. A collet is received into the bore at the distal end of the body and is immovably attached to the body. A closing sleeve extends from the distal end of the body and encircles the collet. A collet housing is attached to the distal end of the body to enclose the collet sleeve. A slide member is positioned in the bore at the proximal end of the body, and the slide member is adapted to be attached to the end of a draw bar of the machine tool. A mechanical linkage connects the slide member and the collet sleeve so that the collet sleeve moves in concert and in conjunction with the slide member and the draw bar. The collet sleeve closes and opens the collet as the collet sleeve moves forward and backward, respectively. The collet does not move relative to the spindle of the machine tool during opening and closing of the collet, but instead maintains a precise, accurate position relative to the spindle of the machine tool.

9 Claims, 2 Drawing Sheets

COLLET CHUCK

BACKGROUND OF THE INVENTION

1. Field of the Invention

The present invention relates to spring collet chucks used on a lathe machine. In particular, the invention relates to a nosepiece assembly for a lathe which comprises a mechanically operated system for closing and opening the spring collet, wherein the closing and opening system is coupled directly through a mechanical linkage to the draw bar of the lathe.

2. State of the Art

Collet chucks, also referred to in the art as spring collets, have been used on machine tools such as lathes for a long time. The collet chuck comprises a cylindrical member that has a central, longitudinal bore. The cylindrical member has a conically flared end that is cut longitudinally into at least three sections. A work piece is positioned within the bore of the collet chuck, and the cut longitudinal pieces at the conically flared end of the cylindrical member are closed against the work piece.

Typically, the collet closer includes a sleeve through which the cylindrical collet is received. The sleeve has generally been immovably coupled to the spindle of the machine tool, and the collet is drawn into the sleeve by a draw bar on the machine tool. As the conical, flared end of the collet engages the sleeve, the cut longitudinal pieces of the collet are forced radially into firm, secure engagement with work piece. Releasing the work piece from the collet is achieved by reversing the movement of the draw bar and collet.

The collet closers as described in the preceding paragraph require longitudinal or axial movement of the collet relative to the machine tool or lathe and the work piece which can result in undesirable altering of the axial position of the work piece relative to the machine tool or lathe. An improved collet closer is disclosed in U.S. Pat. No. 4,690,415 wherein the collet is immovably mounted to the machine tool or lathe, and a floating sleeve moves back and forth on the collet. In this improved closer, the collet does not move relative to the machine tool or the work piece during closing and opening of the collet.

In accordance with U.S. Pat. No. 4,690,415, the floating sleeve is activated by a complex, self contained hydraulic system in which hydraulic fluid acts directly on the floating sleeve. Heretofore, there has been no suggestion of mechanically linking a floating sleeve such as that disclosed in U.S. Pat. No. 4,690,415 directly to the draw bar of the machine tool so as to eliminate the costly, complex, hydraulic system that is required for the operation of the floating sleeve of U.S. Pat. No. 4,690,415.

OBJECTIVES AND BRIEF DESCRIPTION OF THE INVENTION

A principal objective of the invention is to provide a novel, collet closer of the type in which the collet is immovably mounted to the spindle of the machine tool and a collet closing sleeve moves relative to the collet, wherein a mechanical linkage system connects the closing sleeve to the draw bar of a machine tool so that the closing sleeve moves in the same direction and with the same amount of travel as the draw bar.

A particular objective of the present invention is to provide such a mechanically operated collet closer in which all internal cavities in the closer device that accommodate movement of various components of the device are hidden from the internal bore of the device that receives the collet so that any debris that may be introduced on the surface of the collet can not collect in the internal cavities of the closer device.

Another objective of the present invention is to provide such a mechanically operated collet closer in which the closing sleeve is enclosed by a nosepiece housing, wherein that housing is immovably attached to the body of the closer device and the closing sleeve fits snugly within the nosepiece housing for sliding movement within the housing, and whereby the outer surface of the closing sleeve is provided with at least two annular grooves in which resilient O-rings are received so that the O-rings are compressed between the housing and the closing sleeve so as to deaden vibration between the closing sleeve and the housing.

The above objectives are achieved in accordance with the present invention by providing novel collet closer nosepiece assembly for a machine tool such as a lathe. The collet closer assembly comprises a body that is adapted to be attached to the spindle of the machine tool. A pair of bores extend coaxially from each end of the body, with the bores opening into each other within the body. Internal threads are provided on the bore at the distal end of the housing for receiving the threaded end of a collet.

A slide member is positioned in the bore at the proximal end of the body, and the slide member is adapted to be attached to the end of a draw bar of the machine tool. A collet closing sleeve extends from the distal end of the body such that the sleeve encircles a collet when the collet is screwed into the threaded bore at the distal end of the body. A collet housing is attached securely to the distal end of the body and extends from the distal end of the body so as to fit snugly over the collet closing sleeve. The collet housing accommodates sliding movement of the closing sleeve back and forth within the collet housing.

A mechanical linkage extends through slide bores in the distal end of the body, with the mechanical linkage being connected at one end thereof to the slide member and at the other end thereof to the collet closing sleeve, so that the collet closing sleeve moves in concert and conjunction with the slide member. The slide member is adapted to be connected to the draw bar of the machine tool, so that the slide member moves in concert with the draw bar.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings in which:

FIG. 1 is a cross section through a collet closer nosepiece assembly of the present invention; and FIG. 2 is a cross section through the collet closer nosepiece assembly of FIG. 1 wherein the assembly has been rotated about its longitudinal axis to show additional detail of the assembly.

DETAILED DESCRIPTION OF THE ILLUSTRATED EMBODIMENTS

Figure 1:
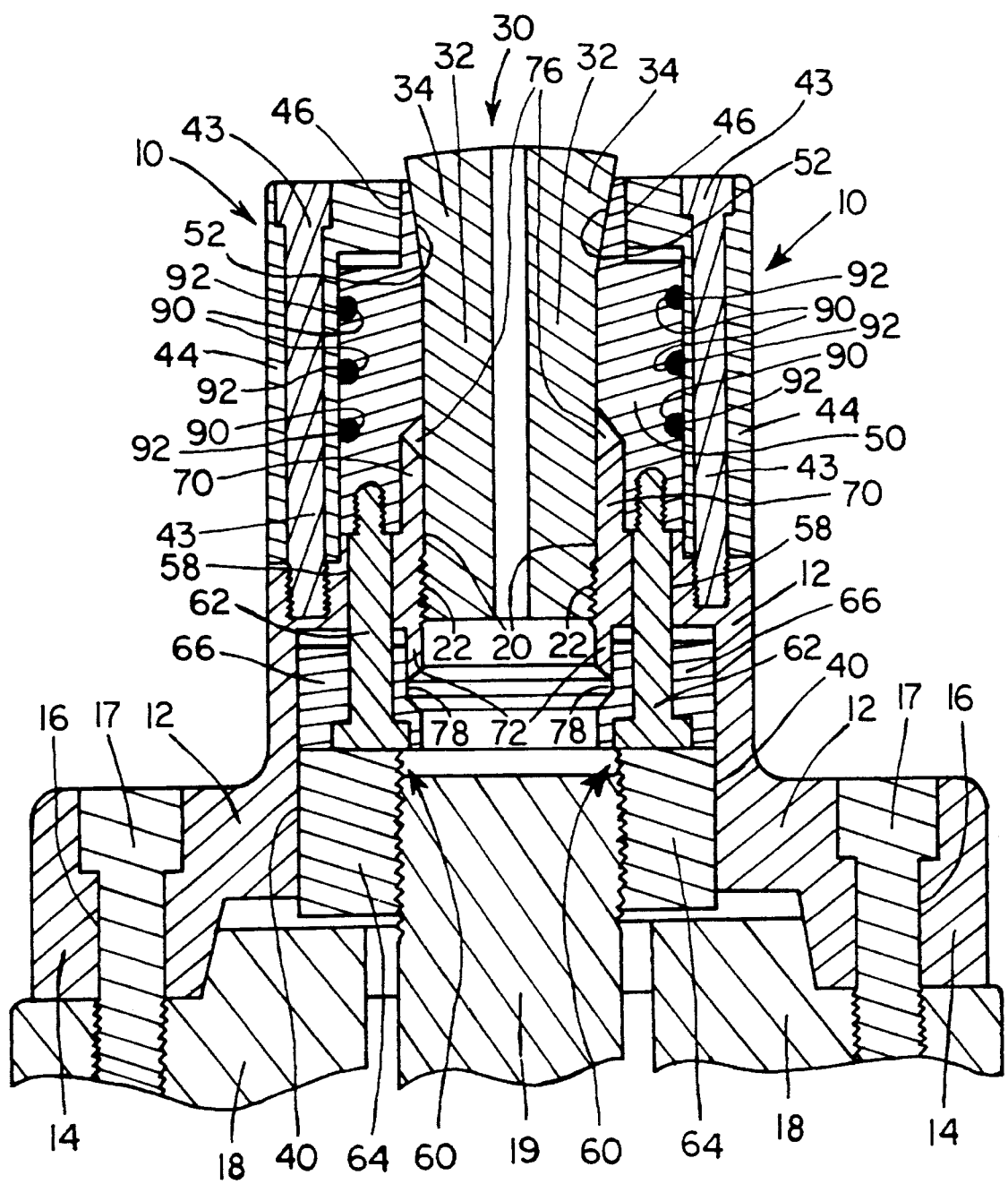

Referring now to the drawings, a preferred embodiment of a collet closer nosepiece assembly 10 in accordance with the present invention is illustrated. The embodiment of the collet closer assembly 10 as illustrated is adapted to be used with a machine tool such as a lathe machine that has a rotatably driven hollow spindle 18 and a draw bar 19 disposed within the spindle 18 so that the draw bar 19 is axially reciprocally movable in the spindle 18.

The collet closer assembly 10 comprises a base member 12 having a first end that is adapted for attachment to the spindle 18 of the machine tool. The base member 12 has a flange-like member 14 adjacent the first end of the base member. As illustrated in FIG. 1, the flange like member 14 has a plurality of openings 16 through which bolts 17 can be inserted to firmly affix the base member 12 to the spindle 18 of the machine tool so that the base member 12 can rotate with the spindle 18.

A first bore 20 extends inwardly from the second or distal end of the base member 12. The first bore 20 is coaxial with the rotational axis of the base member 12 such that the first bore will be coaxially aligned with the draw bar 19 of the machine tool when the base member 12 is attached to the spindle 18 of the machine tool.

The first bore 20 has internal threads 22 that are capable of receiving a threaded end of a spring collet 30. The spring collet 30 is of conventional design well known in the art and comprises a generally cylindrical body 32 having first and second ends. The first end of the cylindrical body 32 has external threads so that the first end of the collet 30 can be threaded to into the first bore 20 of the base member 12. When the threaded first end of the spring collet 30 is screwed into the internal threads 22 of the first bore 20 of the base member 12, the spring collet 30 is immovably mounted to and supported by the base member 12.

The spring collet 30 has a conical nose 34 formed at the second end of the cylindrical body 32. When the spring collet 30 is screwed into the first bore 20 of the base member 12, the cylindrical body 32 and the conical nose 34 of the spring collet 30 are aligned substantially coaxially with the first bore 20 of the base member 12.

The base member 12 has a second bore 40 extending inwardly from the first end thereof. The second bore 40 is substantially coaxial with the first bore 20, and the second bore 40 has a diameter that is greater than the diameter of the first bore 20. The inward end of the second bore 40 extends to the inner end of the first bore 20 so that the first bore 20 opens substantially concentrically into the second bore 40.

A collet housing 44 is attached to the second end of the base member 12 by means of bolts 43, with the collet housing 44 extending from the base member 12. The collet housing 44 has an opening 46 in its distal end that is substantially coaxial with the first bore 20 in the base member 12. The conical nose 34 of the spring collet 30 extends through the opening 46 in the collet housing 44 when the threaded end of the spring collet 30 is screwed into the internal threads 22 of the first bore 20 of the base member 12.

An annular collet sleeve 50 is concentrically disposed within the collet housing 44 so that the collet sleeve 50 encircles the cylindrical body 32 of the collet 30 when the collet 30 is screwed into the internal threads 22 of the first bore 20. The collet sleeve 50 is movable axially back and forth over the surface of the cylindrical body 32 of the collet 30 when the first end of the collet 30 is screwed into the internal threads 22 of the first bore 20 of the base member 12.

The collet sleeve 50 has a flared, concentric opening 52 in an end of the collet sleeve 51 that faces the conical nose 34 of the collet 30 when the collet 30 is screwed into the internal threads 22 of the first bore 20 of the base member 12. The flared opening 52 in the end of the collet sleeve 50 is adapted to engage the conical nose 34 when the annular collet sleeve 50 moves toward the conical nose 34.

Means are provided for mechanically linking the collet sleeve 50 to the draw bar 19 of the machine tool. In the illustrated embodiment a slide means or mechanism 60, which will be more fully described hereinafter, is positioned within the second bore 40 of the base member 12, and the slide means or mechanism 60 is adapted to be mechanically connected to the draw bar 19 of the machine tool.

Linkage members 62, as will also be more fully described hereinafter, extend through slide bores 58 in the second end of the base member 12, and the linkage members 62 mechanically connect the slide means or mechanism 60 to the collet sleeve 50 so that the collet sleeve 50 moves when the slide means or mechanism 60 moves. Inasmuch as the slide means or mechanism 60 is connected directly to the draw bar 19, the collet sleeve 50 moves in the same direction and with the same amount of travel as the draw bar 19. The linkage members 62 make a direct mechanical linkage between the collet sleeve 50 and slide means or mechanism 60 so that the collet sleeve 50 moves with the same axial travel and in the same axial direction as the draw bar 19. The movement of the draw bar 19 controls the movement of the collet sleeve 50 to thereby selectively open or close the spring collet 30, and the axial position of a the spring collet 30 relative to the spindle 18 is unaffected by the closing or opening operations of the spring collet 30.

As illustrated in the drawings, the slide means or mechanism 60 comprises a nut 64 that is adapted to be screwed on the draw bar 19 of the machine tool. The linkage members 62 comprise a plurality of elongate screws that extend from the slide means or mechanism 60 through the slide bores 58 in the second end of the base member 12 to the collet sleeve 50. The elongate screws are attached at respective one ends thereof to the slide means or mechanism 60 and at respective other ends to the collet sleeve 50.

In a particularly preferred embodiment, as illustrated in the drawings, the slide means or mechanism 60 further comprises a retainer ring 66 that is secured to an end of the nut 64 that faces the second end of the base member 12. The linkage members 60 are shoulder screws that are attached to the retainer ring 66 and extend through the slide bores 58 in the second end of the base member 12. There are preferably four or six such linkage members 60 equally spaced around the retainer ring 66.

Figure 2:
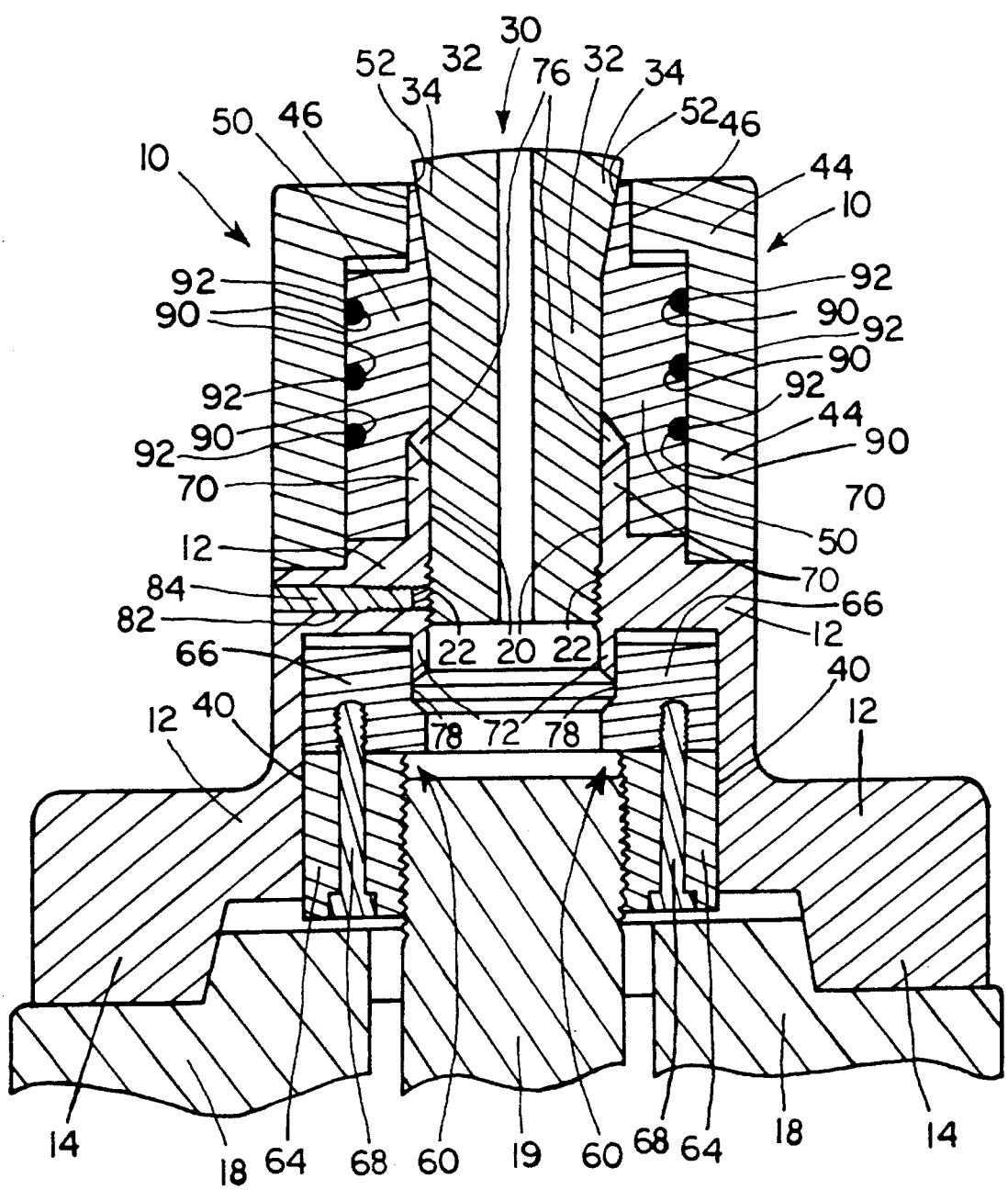

The retainer ring 66 has a cylindrical outer surface that is received for sliding movement along the cylindrical inner surface of the second bore 40 of the base member 12. The retainer ring 66 fits snugly within the second bore 40 for sliding movement back and forth within the second bore 40. The retainer ring is securely affixed to the nut by connecting screws 68. The connecting screws 68 are shown in FIG. 2. FIG. 2 is a cross section substantially identical to that of FIG. 1 except that the collet closer assembly 10 of FIG. 2 has been rotated about its central, longitudinal axis sufficient to show the screws 68. The screws 68 must be offset from the linkage members 60. The screws 68 are preferably spaced uniformly between the centerline axes of the linkage members 60.

The preferred embodiment of the collet closer assembly of the present invention, as illustrated in the drawings, incorporates a pair of flange means associated with the first bore 20. The first flange means forms a protective shield for the interface between the collet sleeve 50 and the second end of base member 12, and the second flange means forms a protective shield for the interface between the slide means or mechanism 60 (in particular the retainer ring 66) and the inner wall of the second bore 40 of the base member 12.

The first of the shield means consists of an annular, cylindrical flange 70 that extends from the second end of the base member 12. The flange 70 abuts the first bore 20 in the base member 12 such that an inside surface of the flange 70 has the same diameter as the first bore 20 and is coaxial with the first bore 20. The second of the shield means consists of an annular, cylindrical, second flange 72 that extends inwardly into the second bore 40 from an inner end of the first bore 20. The second flange 72 has an inside surface that has the same diameter as the first bore 20 and is coaxial with the first bore 20.

The flange 70 of the first shield means is received snugly within a recessed, cylindrical counterbore formed in the end of the collet sleeve 50 that faces the base member 12. As the collet sleeve 50 moves away from the base member 12, the cylindrical wall of the counterbore in the collet sleeve 50 slides along and over the outer surface of the flange 70. The flange 70 forms a protective cover or shield that covers the interface between the second end of the base member 12 and the inner end of the collet sleeve 50 to prevent debris from becoming lodged between the base member 12 and the collet sleeve 50. Prevention of accumulation of debris in the interface between the second end of the base member 12 and the inner end of the collet sleeve 50 also prevents migration of debris to the slide bores 58 in the second end of the base member 12.

When the collet sleeve 50 moves back toward the base member 12, the distal end of the flange 70 approaches the inner end of the cylindrical counterbore in the collet sleeve 50. To mitigate problems with debris migrating to the interface between the distal end of the flange 70 and the inner end of the cylindrical counterbore in the collet sleeve 50, a v-shaped annular accumulation space is formed between the distal end of the flange 70 and the inner end of the cylindrical counterbore in the collet sleeve 50. This v-shaped accumulation ring is formed by (1) sloping the distal end of the flange 70 that extends from the second end of the base member 12 from an exterior perimeter of the flange 70 toward the base member 12, and (2) sloping the interior end of the counterbore in the collet sleeve 50 away from the base member 12. The slopes on the inner end of the counterbore in the collet sleeve 50 and the distal end of the flange 70 creates a v-shaped, annular slot 76. This annular slot 76 accommodates a small amount of debris, and the sloping sides of the v-shaped slot 76 forces the debris away from the sliding surfaces of the counterbore in the collet sleeve 50 and the flange 70 during axial movement of the collet sleeve 50 toward the base member 12.

The flange 72 of the second shield means is received snugly within a recessed, cylindrical counterbore formed in the end of the retainer ring 66 that faces the base member 12. As the retainer ring 66 moves away from the second end of the base member 12, the cylindrical wall of the counterbore in the retainer ring 66 slides along and over the outer surface of the flange 72. The flange 72 forms a protective cover or shield that covers the interface between the inner end of the second bore 40 and the end of the retainer ring 66 that faces the inner end of the second bore 40 so as to prevent debris from becoming lodged between the inner end of the second bore 40 and the end of the retainer ring 66. Prevention of accumulation of debris in the interface between the inner end of the second bore 40 and the end of the retainer ring 66 also prevents migration of debris to the slide bores 58 in the second end of the base member 12.

When the retainer ring 66 moves back toward the inner end of the second bore 40, the distal end of the flange 72 approaches the inner end of the cylindrical counterbore in the retainer ring 66. To mitigate problems with debris migrating to the interface between the distal end of the flange 72 and the inner end of the cylindrical counterbore in the retainer ring 66, a v-shaped annular accumulation space is formed between the distal end of the flange 72 and the inner end of the cylindrical counterbore in the retainer ring 66. This v-shaped accumulation ring is formed by (1) sloping the distal end of the flange 72 that extends inwardly from the inner end of the second bore 40 from an exterior perimeter of the flange 72 toward the second end of the base member 12, and (2) sloping the interior end of the counterbore in the retainer ring 66 away from the second end of the base member 12. The slopes on the inner end of the counterbore in the retainer ring 66 and the distal end of the flange 72 creates a v-shaped, annular slot 78. This annular slot 78 accommodates a small amount of debris, and the sloping sides of the v-shaped slot 78 forces the debris away from the sliding surfaces of the counterbore in the retainer ring 66 and the flange 72 during axial movement of the collet sleeve 50.

As illustrated in FIG. 2 of the drawings, a set screw bore 82 can be provided extending from a side of the base member 12 to the first bore 20. A set screw 84 is received in the set screw bore 82 so that the set screw 84 can be manipulated to exert a force on the threaded end of the collet 30 that is screwed into the internal threads of the first bore 20 in the base member 12 to firmly retain the collet 30 in the first bore 20. The inner end of the set screw 84 is advantageously formed of a plastic material that will firmly engage the threads on the collet 30 without damaging those threads or the exterior surface of the collet 30.

The preferred embodiment of the collet closer assembly 10 of the present invention as illustrated further has at least two annular grooves 90 that are provided in spaced apart positions on an outer surface of the collet sleeve 50 that faces the collet housing 44. A resilient 0-ring 92 is positioned in each of the annular grooves 90 in the collet sleeve 50. The O-rings 92 deaden vibration between the collet sleeve 50 and the collet housing 44.

Although a preferred embodiment of the collet closer assembly of the present invention has been illustrated and described, it is to be understood that the present disclosure is made by way of example and that various other embodiments are possible without departing from the subject matter coming within the scope of the following claims, which subject matter is regarded as the invention.

I claim:

1. A collet closer nosepiece assembly for a lathe machine, wherein said lathe machine has a rotatably driven hollow spindle and a draw bar disposed within the spindle so that the draw bar is axially reciprocally movable in the spindle, said collet closer nosepiece assembly comprising a base member having first and second ends, with the first end of said base member being adapted for attachment to the spindle of the lathe machine so that said base member can be affixed to and supported by the spindle;

a first bore extending inwardly from the second end of said base member, said first bore being coaxially aligned with the draw bar of the lathe machine when said base member is attached to the spindle of the lathe machine;

said first bore having internal threads that are capable of receiving a threaded end of a spring collet, wherein the spring collet comprises a generally cylindrical body having first and second ends, with said first end being threaded to form the threaded end of said spring collet, and with a conical nose formed at said second end of said cylindrical body, whereby when said threaded end of said spring collet is screwed into the internal threads of said first bore, the spring collet is immovably mounted to and supported by said base member with the cylindrical body and conical nose of said spring collet being substantially coaxial with said first bore;

a second bore extending inwardly from the first end of said base member to said first bore, said second bore being substantially coaxial with said first bore and said second bore having a diameter that is greater than the diameter of said first bore so that said first bore opens substantially concentrically into said second bore;

a collet housing attached to and extending from the second end of said base member, said collet housing having an opening in its distal end that is substantially coaxial with the first bore in said base member, whereby the conical nose of said spring collet extends through said opening in said collet housing when the threaded end of said spring collet is screwed into the internal threads of said first bore;

an annular collet sleeve concentrically disposed within said collet housing so that said collet sleeve encircles said collet when said collet is screwed into the internal threads of said first bore, said collet sleeve being movable axially back and forth over the surface of said collet when said collet is screwed into the internal threads of said first bore;

said collet sleeve has a flared, concentric opening in an end of said collet sleeve that faces the conical nose of said collet, so that the flared opening in the end of said collet sleeve engages the conical nose when said annular collet sleeve moves toward said conical nose;

slide means comprising a nut that is screwed on the draw bar and positioned within said second bore of said base member; and linkage members comprising a plurality of screws that extend from said slide member through slide bores in the second end of said base member, said linkage members mechanically connecting said slide means to said collet sleeve so that the collet sleeve moves when the draw bar moves, with the collet sleeve moving with the same axial travel and in the same axial direction as the draw bar so that the movement of the draw bar controls the movement of said collet sleeve to thereby selectively open or close said collet;

whereby the axial position of the collet relative to the spindle is unaffected by the closing or opening operations of the collet.

2. A collet closer nosepiece assembly for a lathe machine in accordance with claim 1 wherein said slide means further comprises a retainer ring that is secured to an end of said nut that faces said second end of said base member, and said elongate screws are shoulder screws that are attached to said retainer ring and extend through said slide bores in the second end of said base member to said collet sleeve.

3. A collet closer nosepiece assembly for a lathe machine in accordance with claim 2 wherein said nut and said retainer ring each has a cylindrical outer surface that fits snugly within said second bore for sliding movement back and forth within said second bore.

4. A collet closer nosepiece assembly for a lathe machine in accordance with claim 2 wherein an annular, cylindrical flange extends from the second end of said base member, with said flange abutting the first bore in said base member such that an inside surface of said flange has the same diameter as said first bore and is coaxial with said first-bore; and said collet sleeve has a recessed, cylindrical counterbore formed in an end of said collet sleeve that faces said base member so that said annular flange on said base member is received within said counterbore, whereby said flange forms a protective cover over the interface between said second end of said base member and said collet sleeve so as to prevent debris from becoming lodged between said base member and said collet sleeve.

5. A collet closer nosepiece assembly for a lathe machine in accordance with claim 1 further comprising a set screw bore extending from a side of said base member to said first bore; and a set screw received in said set screw bore, whereby said set screw can be manipulated so as to exert a force on a threaded end of a collet that is screwed into the internal threads of said first bore to firmly retain the collet in said first bore.

6. A collet closer nosepiece assembly for a lathe machine in accordance with claim 1 wherein at least two annular grooves are provided in spaced apart positions on an outer surface of said collet sleeve that faces said collet housing; and a resilient O-ring is positioned in each of said annular grooves in said collet sleeve, whereby said O-rings deaden vibration between the collet sleeve and the collet housing.

7. A collet closer nosepiece assembly for a lathe machine, wherein said lathe machine has a rotatably driven hollow spindle and a draw bar disposed within the spindle so that the draw bar is axially reciprocally movable in the spindle, said collet closer nosepiece assembly comprising a base member having first and second ends, with the first end of said base member being adapted for attachment to the spindle of the lathe machine so that said base member can be affixed to and supported by the spindle;

a first bore extending inwardly from the second end of said base member, said first bore being coaxially aligned with the draw bar of the lathe machine when said base member is attached to the spindle of the lathe machine;

said first bore having internal threads that are capable of receiving a threaded end of a spring collet, wherein the spring collet comprises a generally cylindrical body having first and second ends, with said first end being threaded to form the threaded end of said spring collet, and with a conical nose formed at said second end of said cylindrical body, whereby when said threaded end of said spring collet is screwed into the internal threads of said first bore, the spring collet is immovably mounted to and supported by said base member with the cylindrical body and conical nose of said spring collet being substantially coaxial with said first bore;

a second bore extending inwardly from the first end of said base member to said first bore, said second bore being substantially coaxial with said first bore and said second bore having a diameter that is greater than the diameter of said first bore so that said first bore opens substantially concentrically into said second bore;

a collet housing attached to and extending from the second end of said base member, said collet housing having an opening in its distal end that is substantially coaxial with the first bore in said base member, whereby the conical nose of said spring collet extends through said opening in said collet housing when the threaded end of said spring collet is screwed into the internal threads of said first bore;

an annular collet sleeve concentrically disposed within said collet housing so that said collet sleeve encircles said collet when said collet is screwed into the internal threads of said first bore, said collet sleeve being movable axially back and forth over the surface of said collet when said collet is screwed into the internal threads of said first bore;

said collet sleeve has a flared, concentric opening in an end of said collet sleeve that faces the conical nose of said collet, so that the flared opening in the end of said collet sleeve engages the conical nose when said annular collet sleeve moves toward said conical nose;

slide means positioned within said second bore of said base member, said slide means being adapted to be mechanically connected to the draw bar, with said slide means comprising (a) a nut that is adapted to be screwed on said draw bar and (b) a retainer ring that is secured to an end of said nut that faces said second end of said base member;

linkage members comprising a plurality of elongate screws that extend from said slide means through slide bores in the second end of said base member to said collet sleeve, with said elongate screws being attached at respective one ends thereof to said retainer ring and at respective other ends to said collet sleeve, whereby said linkage members mechanically connect said slide means to said collet sleeve so that the collet sleeve moves when the draw bar moves, with the collet sleeve moving with the same axial travel and in the same axial direction as the draw bar so that the movement of the draw bar controls the movement of said collet sleeve to thereby selectively open or close said collet;

an annular, cylindrical flange extending from the second end of said base member, with said flange abutting the first bore in said base member such that an inside surface of said flange has the same diameter as said first bore and is coaxial with said first bore;

the distal end of said flange that extends from the second end of said base member slopes from an exterior perimeter of said flange toward said base member;

said collet sleeve has a recessed, cylindrical counterbore formed in an end of said collet sleeve that faces said base member so that said annular flange on said base member is received within said counterbore; and the counterbore has an interior end that slopes away from said base member, whereby the axial position of a the collet relative to the spindle is unaffected by the closing or opening operations of the collet, further whereby said flange forms a protective cover over the interface between said second end of said base member and said collet sleeve so as to prevent debris from becoming lodged between said base member and said collet sleeve, and still further whereby a v-shaped, annular slot is formed between the distal end of said flange and the inner end of said counterbore to accommodate any debris in the v-shaped slot as the inner end of the counterbore in said collet sleeve approaches the distal end of said flange during axial movement of said collet sleeve toward said base member.

8. A collet closer nosepiece assembly for a lathe machine in accordance with claim 7 wherein an annular, cylindrical, second flange extends inwardly into said second bore from an inner end of said first bore, with said second flange having an inside surface that has the same diameter as said first bore and is coaxial with said first bore; and said retainer ring has a recessed, cylindrical counterbore formed in an end of said retainer ring that faces said base member so that said second annular flange on said base member is received within the counterbore in said retainer ring, whereby said second flange forms a protective cover over the interface between an inner end of said second bore and an end of said retainer ring that faces the inner end of said second bore so as to prevent debris from becoming lodged between the inner end of said second bore and said retainer ring.

9. A collet closer nosepiece assembly for a lathe machine in accordance with claim 8 wherein the distal end of said second flange that extends inwardly from the inner end of said second bore slopes from an exterior perimeter of said second flange toward said second end of said base member; and the counterbore in said retainer ring has an interior end that slopes away from said second end of said base member, whereby a v-shaped, annular, second slot is formed between the distal end of said second flange and the inner end of said counterbore in said retainer ring to accommodate any debris in the v-shaped, second slot as the inner end of the counterbore in said retainer ring approaches the distal end of said second flange during axial movement of said collet sleeve away from said base member.

* * * * *